Jan. 20, 1925.

G. U. BRAKE 1,524,004

CONTROLLING MECHANISM FOR LIQUID DISPENSERS

Filed Sept. 11, 1920     4 Sheets-Sheet 2

Inventor

George U. Brake

By H. G. Burns

Attorney

Jan. 20, 1925.  1,524,004
G. U. BRAKE
CONTROLLING MECHANISM FOR LIQUID DISPENSERS
Filed Sept. 11, 1920     4 Sheets-Sheet 3

George U. Brake, Inventor

By H. G. Burns, Attorney

Jan. 20. 1925.

G. U. BRAKE 1,524,004

CONTROLLING MECHANISM FOR LIQUID DISPENSERS

Filed Sept. 11, 1920   4 Sheets-Sheet 4

Inventor
George U. Brake
By H. G. Burns
Attorney

Patented Jan. 20, 1925.

1,524,004

UNITED STATES PATENT OFFICE.

GEORGE U. BRAKE, OF FORT WAYNE, INDIANA, ASSIGNOR TO TOKHEIM OIL TANK AND PUMP COMPANY, A CORPORATION OF INDIANA.

CONTROLLING MECHANISM FOR LIQUID DISPENSERS.

Application filed September 11, 1920. Serial No. 409,622.

*To all whom it may concern:*

Be it known that I, GEORGE U. BRAKE, a citizen of the United States of America, and resident of Fort Wayne, in the county of Allen and State of Indiana, have invented certain new and useful Improvements in Controlling Mechanism for Liquid Dispensers, of which the following is a specification.

This invention relates to improvements in controlling mechanism for liquid dispensers of that type in which a motor driven pump is used in conjunction with a measure for holding and displaying liquid preliminary to being discharged through a valve controlled outlet to the purchaser, and the object of the invention is to provide a device for selectively operating the pump and the discharge of the measure in a manner as will circumvent simultaneous supplying and discharging liquid to and from the measure so that the quantity of liquid supplied to the measure may be observed and thus ascertained before being discharged from the measure.

The object of the invention is accomplished by the construction illustrated in the accompanying drawings in which.

Similar characters of reference indicate corresponding parts throughout the several views and referring now to the same.

Figure 1:
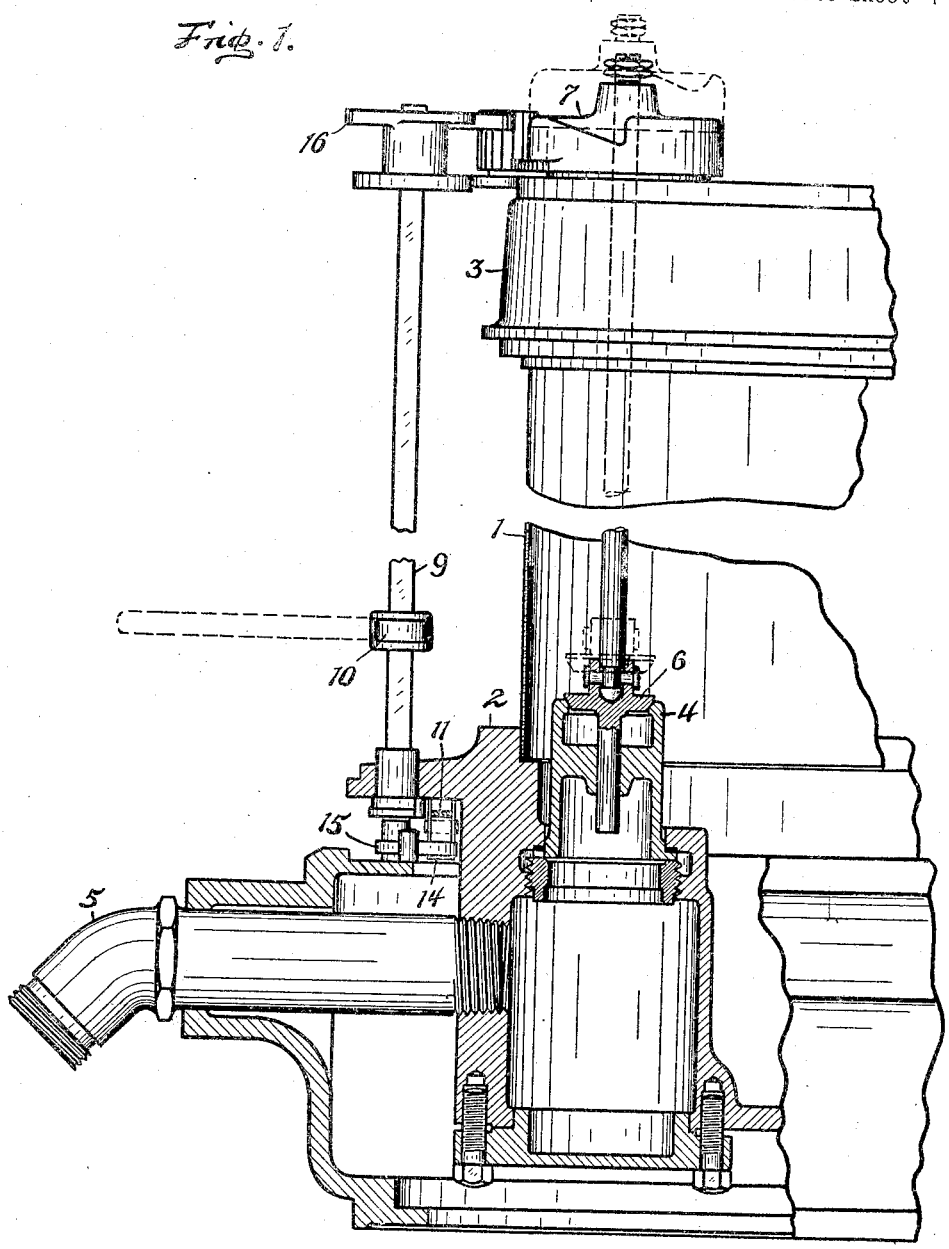
Fig. 1 is an elevation of a portion of a liquid dispenser including part of the measure and the discharge outlet mechanism, and showing the controlling device applied thereto, the view being shown partially broken away and in section.
Figure 2:
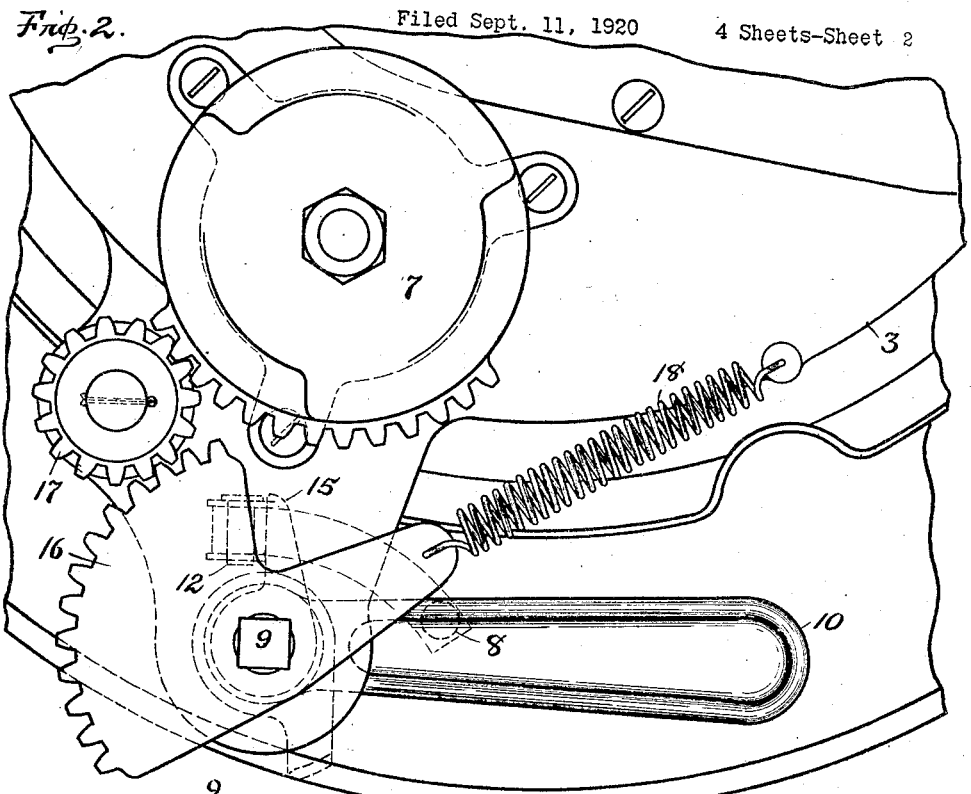
Fig. 2 is a detail view showing a plan of the discharge valve actuating mechanism and the present invention in connection therewith.
Figure 3:
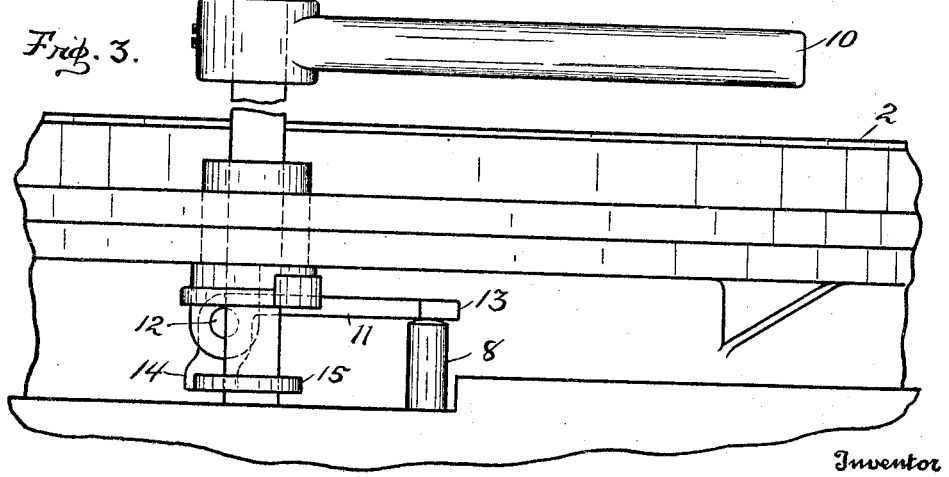
Fig. 3 is another detail view showing an elevation of the present invention applied to a dispenser, the view being projected from Fig. 2, both of which views are upon a larger scale than that of Fig. 1.
Figure 4:
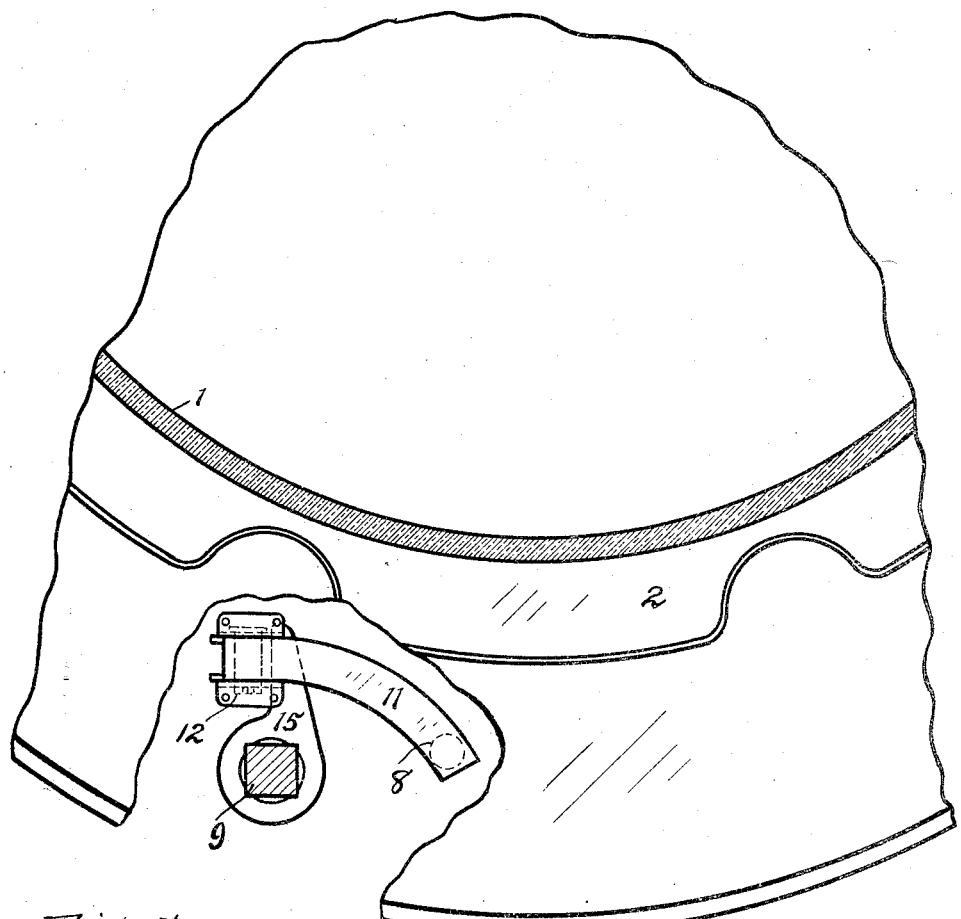
Fig. 4 is a detail plan view of a portion of the base for the measure and the switch controlling device, there being a portion of the base broken away.
Figure 5:
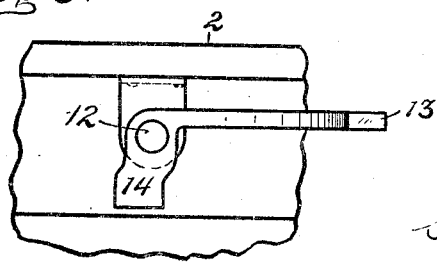
Fig. 5 is a detail view of the bell-crank for actuating the switch, the view being projected from Fig. 4.
Figure 6:
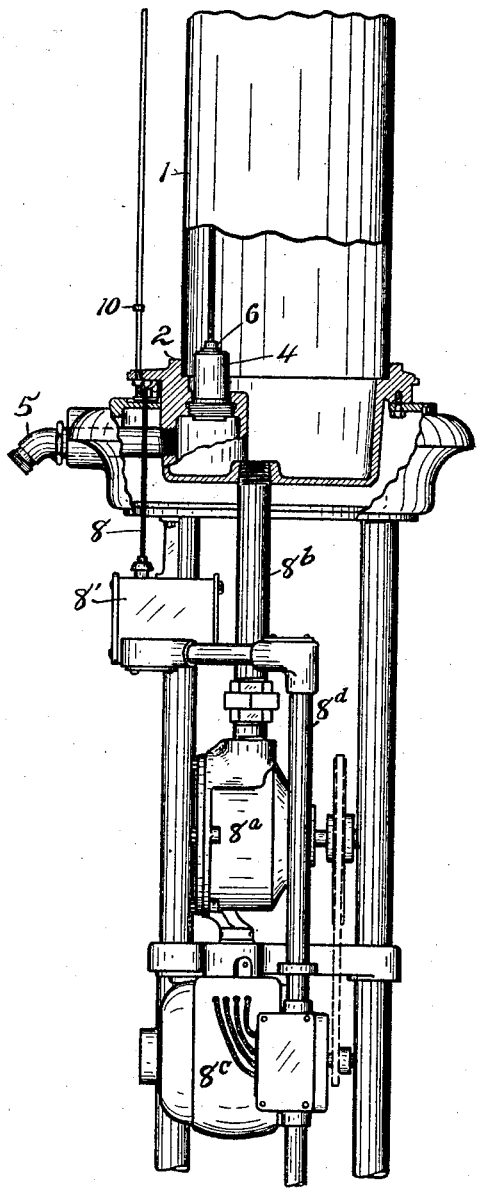
Fig. 6 is an elevation of a portion of a dispenser embodying the invention and in which is shown the measure, the supply means for same and the switch for controlling the supply means, a portion being broken away and in section.

The dispenser herein shown as an example of the type of apparatus of its class with which the present invention is intended for use, includes a measure having a glass cylinder 1, a base 2 upon which it is mounted, and a cover 3 upon its top. Also, the dispenser has an outlet port 4 through which liquid is discharged from the cylinder and admitted to the discharge outlet 5, and a discharge valve 6 and actuating mechanism 7 therefor adapted to lift the valve when operated.

Movably mounted in the base is a push-rod 8 that has actuating relation with an electrical switch 8′ for controlling the supply means for filling the measure. The supply means in this instance consists of a pump 8ª having a pipe connection 8ᵇ with the measure, and an electrical motor 8ᶜ having actuating relation with the pump and electrical connection 8ᵈ with the switch 8′ by which it is controlled.

The invention is comprised of an oscillating member 9 including a handle 10, and having means associated therewith to cause selective functioning of the liquid supply means and the liquid discharge valve, and also a tension device for holding the controlling mechanism in neutral position.

The means for controlling the supply means is comprised of a bell-crank 11 mounted upon a pivot 12 and with one of its ends 13 resting in connection with the push-rod 8 and with its other end 14 positioned so as to become engaged and actuated by a finger 15, that is fixed upon the oscillating member 9, when the latter member is moved in one direction from its neutral position, the consequent action of the bell-crank being such as to depress the push-rod so as to close the switch.

The means for operating the actuating mechanism 7 of the discharge valve, in this instance, is comprised of a gear sector 16 and an intermediate pinion 17 arranged so as to impart movement from the oscillating member to the valve actuating mechanism, it being the intention that when the oscillating member is moved from its neutral position in the direction opposite that of the former instance the valve will become lifted and the discharge of the liquid from the receptacle through the discharge port effected.

The tension device herein shown is comprised of a retracting spring 18 anchored at one end to the cover 3 and secured at its opposite end to the gear sector at a point thereon in line with the axial center of the oscillating member and the point of its connection with the cover, so that the spring tends to hold the oscillating member in neutral position.

By use of the invention thus constructed, the operations of supplying liquid to the measure and effecting its discharge therefrom are both controlled by manipulating the handle 10: By pressing the handle inwardly from its neutral position the bell-crank 11 is caused to tilt upon its pivot and depress the push-rod 8 which causes operation of the supply means for filling the measure, and when released, the handle through the action of the spring 18, automatically returns to neutral position thus relieving the push-rod so that the operation of the supply means stops; and by moving the handle 10 outwardly the finger 15 is moved away from the bell-crank leaving it inert, and the actuating mechanism, through the sector and pinion is moved in the direction which causes the valve to be lifted from the port, thus permitting the liquid in the measure to become discharged therefrom. Thus, concurrent operations of filling and emptying the measure with liquid are averted.

What I claim is:

In mechanism for controlling a liquid dispenser having a discharge valve and a supply means having a push-rod for controlling the same, an oscillating member including an operating handle; a finger fixed upon the oscillating member; a pivoted lever adapted to be actuated by the finger when the handle is moved in one direction, and having operable connection with the push-rod, a mechanism in connection with the oscillating member adapted to effect operation of the discharge valve when the handle is moved in the opposite direction; and means tending to hold the oscillating member in neutral position.

In testimony whereof I affix my signature, in presence of two witnesses.

GEORGE U. BRAKE.

Witnesses:
MATILDA NETTLES.
W. G. BURNS.